United States Patent [19]

Imai et al.

[11] 4,236,200
[45] Nov. 25, 1980

[54] SEMICONDUCTOR CIRCUIT HAVING A SERIES-CONNECTED REACTOR

[75] Inventors: Koji Imai, Fuchu; Sumio Kobayashi, Yokohama; Ko Kumai, Kamakura; Toshihiko Tsuji, Tokyo, all of Japan

[73] Assignees: Tokyo Shibaura Denki Kabushiki Kaisha, Kawasaki; Nippon Kinzoku Co., Ltd., Tokyo, both of Japan

[21] Appl. No.: 938,239

[22] Filed: Aug. 30, 1978

[30] Foreign Application Priority Data

Sep. 7, 1977 [JP] Japan .................................. 52-107492

[51] Int. Cl.² .......................................... H02M 7/515
[52] U.S. Cl. ..................................... 363/135; 336/233
[58] Field of Search ................... 336/83, 233; 363/135

[56] References Cited

U.S. PATENT DOCUMENTS

| | | | |
|---|---|---|---|
| 1,292,206 | 1/1919 | Woodruff | 336/233 X |
| 1,297,127 | 3/1919 | Elmen | 336/233 X |
| 1,809,042 | 6/1931 | Kelsall | 336/233 X |
| 2,905,915 | 9/1959 | Harris | 336/83 X |
| 3,380,004 | 4/1968 | Hansen | 336/83 UX |
| 3,405,346 | 10/1968 | Krauthamer | 363/135 |
| 3,470,449 | 9/1969 | Risberg | 363/135 |
| 3,609,511 | 9/1971 | Risberg | 363/135 |
| 3,835,430 | 9/1974 | Kocsis | 336/83 |
| 3,953,251 | 4/1976 | Butherus et al. | 148/105 |

OTHER PUBLICATIONS

G. Irminger, "Thyristor Circuitry", The *Brown Boveri Review*, Oct., 1967, pp. 657–671.

*Primary Examiner*—William M. Shoop
*Attorney, Agent, or Firm*—Oblon, Fisher, Spivak, McClelland & Maier

[57] ABSTRACT

A semiconductor circuit comprising a reactor including a closed magnetic path core of a compression molding which is formed of a mixture of an insulating material and particles of magnetic substance and a conductor magnetically interlinking to the core, and a semiconductor element connected in series with the reactor.

9 Claims, 8 Drawing Figures

SEMICONDUCTOR CIRCUIT HAVING A SERIES-CONNECTED REACTOR

This invention relates to a semiconductor circuit, in which stress produced at the time when a semiconductor element is turned on is absorbed.

Electric power converters for converting AC to DC, converters for converting DC to AC or such converters as choppers usually incorporate as part of the component elements a semiconductor circuit, which comprises a semiconductor element such as a thyristor or transistor and a reactor connected in series with the semiconductor element and serving to absorb stress produced at the time when the semiconductor element is turned on (hereinafter referred to as turn-on stress).

FIG. 1 shows an example of such a semiconductor circuit, and of a converter constructed by using a plurality of such semiconductors. In the circuit diagram of FIG. 1, designated by numerals $12_1$, $12_2$, ..., $12_n$ are thyristors serving as respective semiconductor elements and connected in series with one another. Connected to the anode side and cathode side of this series thyristor circuit are reactors 14 and 16 which serve to absorb the turn-on stress in the thyristors $12_1$, $12_2$, ..., $12_n$. Although two reactors 14 and 16 are provided in the diagram of FIG. 1, it will be sufficient if either one of the reactors 14 and 16 is provided to absorb the turn-on stress. A parallel circuit comprising a resistor $18_1$ and a series circuit consisting of a capacitor $20_1$ and a resistor $22_1$ is connected between the anode and cathode of a thyristor $12_1$, a parallel circuit comprising a resistor $18_1$ and a series circuit consisting of a capacitor $20_2$ and a resistor $22_2$ is connected between the anode and cathode of the thyristor $12_2$, and likewise a parallel circuit comprising a resistor $18_n$ and a series circuit consisting of a capacitor $20_n$ and a resistor $22_n$ is connected between the anode and cathode of the thyristor $12_n$. The individual parallel circuits serve as voltage divider circuit for equalizing the voltage applied to each of the thyristors $12_1$, $12_2$, ..., $12_n$.

The term "turn-on stress of the semiconductor element" means (1) power loss represented by the product of voltage appearing in the anode-cathode path of the semiconductor element and current in the element when the element is turned on and also (2) impression of an overvoltage upon a particular one of a plurality of semiconductor elements connected in series due to variations of the turn-on periods of the individual elements. Either turn-on stress (1) or (2) mentioned above is affected by current flowing into the element or elements, and by suitably controlling this current the turn-on stress of the element can be absorbed. The control of the current is effected by means of reactors connected in series with the elements. The reactors for absorbing the turn-on stress of the elements are required to have characteristics (1) that a desired inductance is shown for the turn-on period of the elements (usually several microseconds) and (2) that they are saturated to show a low impedance when the current flowing through the elements exceeds a predetermined value. In other words, it is required to show as high inductance as possible just at the time of turning-on of the elements so as to suppress sudden rise of current flowing through the circuit and also show as low impedance as possible after the completion of turning-on of the elements so as to minimize the voltage drop across the circuit.

The reactors which have hitherto been used include air core reactors, cut core reactors and reactors using endless cores of ferrite or the like. These reactors have their peculiar merits and demerits.

With the air core reactor, in which no core is used, no eddy current is produced within the core. Therefore, although frequency characteristics with respect to the inductance are superior, it is necessary to increase the number of turns of the conductor in order to provide a desired inductance. Consequently, the size of the reactor is increased, so that it is not suited for powerful converters of a rated current and a rated voltage. In addition, regarding the saturation characteristic of the impedance the required characteristics as mentioned above cannot be obtained.

In case of the cut core reactor, in which the core consists of two cores disposed on opposite sides of a gap, a practically ideal saturation characteristic of the inductance can be obtained by suitably selecting the material of the core, sectional area of the core, dimension of the gap, number of turns of the conductor and so forth. However, due to the eddy current that is produced in the steel plate lamination constituting the core the frequency characteristic of the inductance is unsatisfactory, so that it is difficult to provide a desired inductance in a frequency band above 100 to 200 KHz.

Additionally, the current characteristic of the ordinary cut core reactor at the time of turning-on is as shown by curve A in FIG. 2: it is greatly deviated from the ideal characteristic of curve B. Curve C in FIG. 2 shows the terminal voltage across the semiconductor circuit constituted by the semiconductor elements and reactors connected in series with the semiconductor elements.

In addition, in the cut core reactor the rate of change of the magnetic flux within the core of the reactor when the elements are turned on is extremely high, so that a high impact force is applied to the gap between the opposite side cores to give rise to violent acoustic noise. Consequently, in a converter adopting this cut core reactor provision of a particular noiseproof means is necessary to cope with the noise, and the cost of the system as a whole is thus increased.

In the case of the reactor, in which a conductor is passed through an endless core made of a magnetic material of excellent frequency characteristics such as ferrite, its inductance is suddenly saturated to zero with only a slight current flowing through it, as shown by curve A in FIG. 3, and a great quantity of the core material is required in order to approximate the ideal characteristic of curve B. (Curve C represents a characteristic curve in an air core reactor.) Therefore, if it is intended to construct a converter of a practical size, it is required to minimize extremely the fluctuations of the turn-on periods of a plurality of semiconductors, which leads to uneconomical design.

From the above discussion, the provision of a semiconductor circuit incorporating a reactor, which can meet both the frequency characteristic and saturation characteristic with respect to the inductance to provide for absorption of the turn-on stress of the semiconductor elements and is free from the acoustic noise generation, is desired.

The present invention is intended in the light of the above aspects, and its object is to provide a semiconductor circuit, which incorporates a reactor functioning to provide a desired inductance at the time of turning-on of semiconductor elements connected in series for sufficiently suppressing current and provide a low impedance for reducing the voltage drop after the completion of the turning-on of the elements and giving rise to greatly reduced acoustic noise, and with which the turn-on stress is absorbed.

This invention can be more fully understood from the following detailed description when taken in conjunction with the accompanying drawings, in which.

Figure 1:
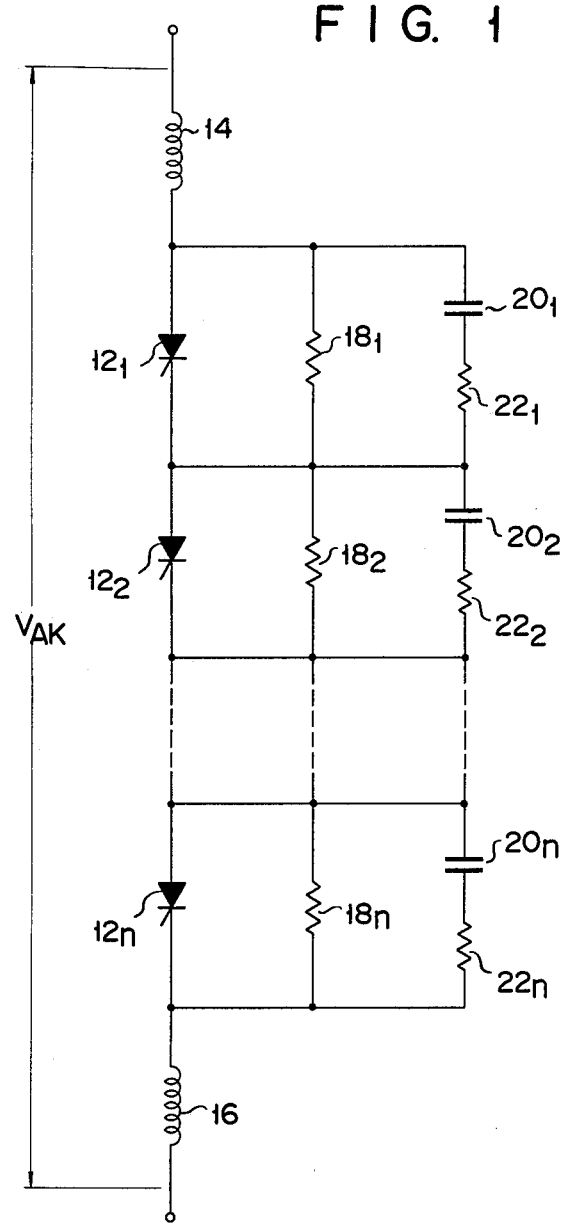
FIG. 1 is a circuit diagram showing a semiconductor circuit comprising a series circuit consisting of semiconductor elements and reactors.
Figure 4:
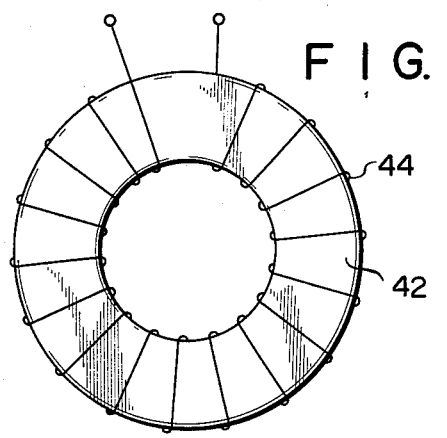
FIG. 4 is a view showing a reactor suited for connection in series with the semiconductor elements in the semiconductor circuit shown in FIG. 1.
Figure 5:
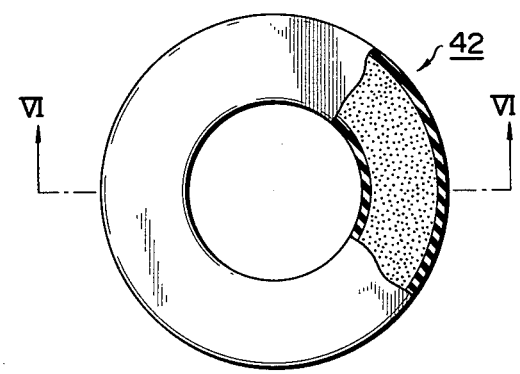
FIG. 5 is a plan view showing a core assembly of the reactor shown in FIG. 4, with part of the core being removed.

FIG. 4 shows an example of the reactor suitable as turn-on stress absorption reactor (i.e., reactors 14 and 16) in the semiconductor circuit including thyristors $12_1, 12_2, \ldots, 12_n$ as shown in FIG. 1. FIG. 5 shows a plan view of the core assembly of the reactor shown in FIG. 4 with a portion removed to expose its inside, and FIG. 6 is a sectional view of the core assembly shown in FIG. 5 and taken along line 6—6 therein.

As is clearly shown in FIG. 4, the reactor comprises an annular closed magnetic path core assembly 42 with a magnetization current conductor 44 wound on the outer periphery of the annular core assembly 42 in a direction at right angles to the direction of axis of the core assembly so as to magetically interlink to the annular magnetic path of the annular core assembly 42.

Figure 6:
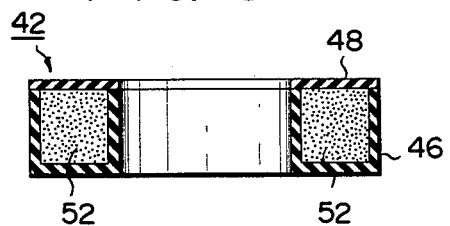
FIG. 6 is a sectional view of the core assembly shown in FIG. 5 and taken along line 6—6 therein.

As is clearly seen from FIGS. 5 and 6, the core assembly 42 comprises an annular container member 46 made of an insulating material and defining a groove of a substantially channel-shaped sectional profile, an annular lid member 48 made of an insulating material closing the annular top opening of the container member 46 and an annular compression molding made of a mixture of an insulating material and particles of magnetic substance filled in the afore-mentioned channel-shaped groove. Electrolytic iron, carbonyl iron, Armco iron, etc. may be used for the magnetic substance. Examples of the insulating material 52 for compression molding are varnish, fatty oils and fats, epoxy resins and polyester resins. Further, there may be used a mixture including at least two members selected from a group consisting of electrolytic iron, carbonyl iron and Armco iron for the magnetic substance.

Since the core assembly 42 is a compression molding of an insulating material as shown above, a number of magnetic substance particles which are incorporated within the molding are secured to the molded insulating material in the state electrically insulated from one another by the insulating material. Thus, eddy currents resulting from changes of the magnetic flux in the core assembly 42 with changes of the magnetizing current flowing in the conductor wire 44 can be suppressed to be extremely low. Thus, it is possible to greatly improve the frequency characteristic as the reactor and obtain very excellent frequency characteristics without substantial change of the impedance over a range extending from a low frequency band to a high frequency band of the order of 1 MHz.

Figure 2:
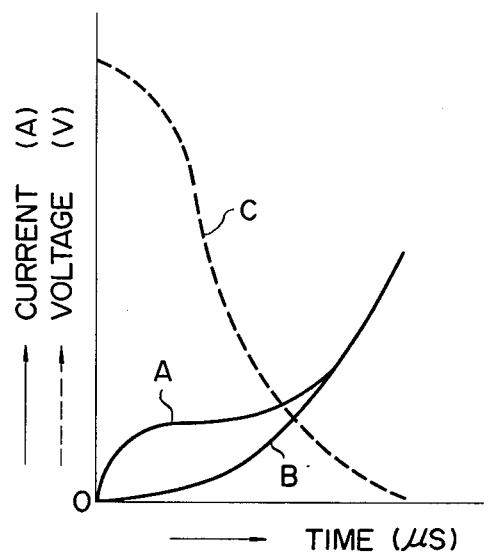
FIG. 2 is a graph showing characteristic curves of current and voltage at the time of turning-on of the semiconductor elements.
Figure 3:
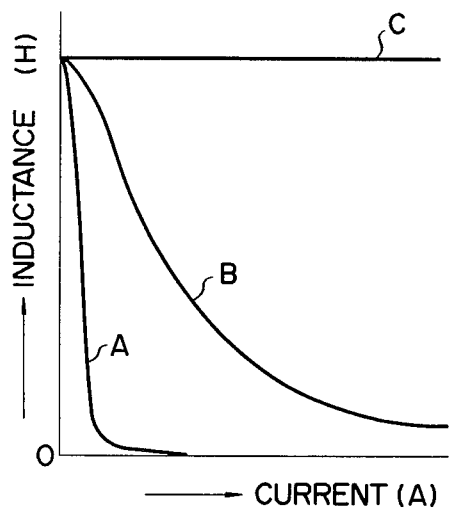
FIG. 3 is a graph showing saturation characteristic curves of the inductance of reactors.

In the mean time, in the semiconductor circuit as shown in FIG. 1 the voltage between the anode and cathode of the semiconductor elements, that is thyristors $12_1, 12_2, \ldots, 12_n$, at the time of turning-on usually varies from about 100 KHz to about 1 MHz in terms of the frequency. The reactor shown in FIGS. 4, 5 and 6 shows the desired inductance over this frequency range. This means that when this reactor is utilized as reactors in the semiconductor circuit as shown in FIG. 1, current that is caused at the time of turning on the semiconductor elements (i.e., thyristors $12_1, 12_2, \ldots, 12_n$) is ideal as shown by curve B in FIG. 2, so that the turn-on stress can be effectively suppressed.

In another aspect, with a change of current that takes place when the thyristors $12_1, 12_2, \ldots, 12_n$ in the semiconductor circuit in FIG. 1 a sudden change of the flux is produced within the core of the reactor, thus giving rise to the generation of a considerable force that may constitute a source of acoustic noise. When the reactor shown in FIGS. 4, 5 and 6 is used as the reactors in the semiconductor circuit of FIG. 1, the afore-mentioned force can be shared by a number of particles of magnetic substance which are incorporated in the compression molding insulator 52 and spaced apart from one another by the insulator 52. Thus, it is possible to prevent this force from constituting a noise source. This means that a converter consisting of a semiconductor circuit using such reactors does not require provision of any special means for preventing acoustic noise.

The reactor shown in FIGS. 4, 5 and 6 has a characteristic that by increasing the proportion of the magnetic substance particles, that is, the density of integration, the inductance is increased while the saturation current is reduced and that by conversely reducing the density of integration the saturation current is increased while the inductance is reduced and a characteristic that the inductance varies with the grain size of the magnetic substance particles. Thus, it is possible to obtain a reactor, which is ideal with respect to both frequency characteristic and saturation characteristic, by suitably selecting the density of integration and grain size of the magnetic substance particles, specifically selecting the grain size to 150 to 200 mesh and the integration degree to 5 to 10 g/cm$^3$.

As has been described, by assembling reactors as shown in FIGS. 4, 5 and 6 with the core constituted by a compression molding of an insulating material incorporating magnetic substance particles it is possible to provide a semiconductor circuit, with which the turn-on stress of the semiconductor elements (i.e., thyristors $12_1, 12_2, \ldots, 12_n$) is greatly improved.

The reactor for absorbing the turn-on stress of the semiconductor elements is by no means limited to one shown in FIGS. 4, 5 and 6, and various other forms can be contemplated without departing from the concept of the reactor which includes a core constituted by an insulating material molding incorporating magnetic substance particles.

Figure 7:
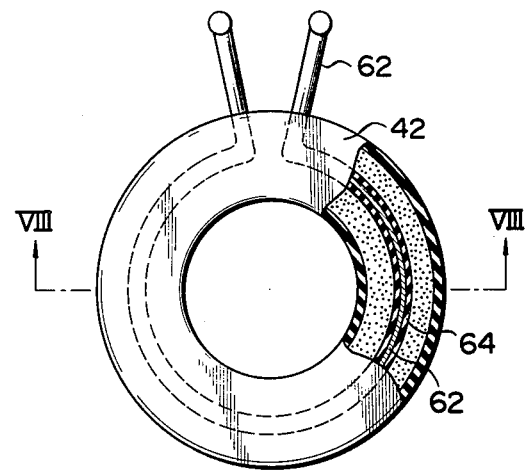
FIG. 7 is a view showing a different reactor, with part of the core being removed.
Figure 8:
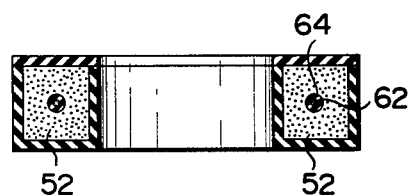
FIG. 8 is a sectional view of the reactor shown in FIG. 7 and taken along line 8—8 therein.

FIG. 7 shows an example of the different form of the reactor. In this reactor, unlike the reactor shown in FIG. 4, a magnetization current conductor wire 62 is not wound on the outer periphery of the core assembly but extends along the center of the core assembly 42, that is, along the annular center line of the core assembly 42. The conductor wire 62 and molding 52 are electrically insulated from each other by a tube-like member 64 made of an insulating material surrounding the conductor wire 62. This is shown particularly clearly in the sectional view of FIG. 8. In FIGS. 7 and 8, the conductor wire 62 and tube-like member 64 alone are shown in an exaggerated.

Either in the reactor shown in FIG. 4 or in the reactor shown in FIG. 7 the conductor wire is used to conduct current for magnetizing the core assembly 42, so that it is apparent that various other forms of the disposition of the conductor wire are conceivable.

Further, while the description so far is concerned with thyristors as semicondutor elements connected in series with reactors, the invention is by no means limited to thyristors and can of course applicable to all semiconductor elements which are turned on upon reception of a control signal, for instance transistors.

As has been described in the foregoing, by assembling the reactor shown in FIG. 4 or FIG. 7, having a core constituted by a compression molding consisting of an insulating material incorporating magnetic substance particles, for instance, as reactors in the semiconductor circuit as shown in FIG. 1 it is possible to provide a semiconductor circuit with which the turn-on stress of the semiconductor elements can be greatly improved.

What we claim is:

1. A semiconductor circuit comprising:
    at least one reactor including a closed magnetic path core of a compression molding which is made of a mixture of an insulating material and particles of magnetic substance, a conductor adapted to carry current for magnetizing said molding core and an insulating means for electrically insulating said molding core from said conductor; and
    at least one semiconductor element connected in series with said reactor;
    wherein the grain size of said magnetic substance particles is substantially 150 to 200 mesh; and
    wherein said compression molding core has an integration degree of substantially 5 to 10 g/cm$^3$.

2. A semiconductor circuit according to claim 1, wherein said molding core is of an annular form.

3. A semiconductor circuit according to claim 2, wherein said conductor is so wound as to magnetically interlink to the annular magnetic path of said annular form molding core.

4. A semiconductor circuit according to claim 1, wherein said conductor extends through said molding core along the axis thereof.

5. A semicondcutor circuit according to claim 1, wherein said insulating material is a member selected from a group consisting of varnish, fatty oils and fatts, epoxy resins and polyester resins.

6. A semiconductor circuit according to claim 1, wherein said magnetic substance is a member selected from a group consisting of electrolytic iron, carbonyl iron and Armco iron.

7. A semiconductor circuit according to claim 1, wherein said magnetic substance is a mixture including at least two members selected from a group consisting of electrolytic iron, carbonyl iron and Armco iron.

8. A semiconductor circuit according to claim 1, wherein said semiconductor element is one of the elements which constitute an electric power converter apparatus.

9. A semiconductor circuit according to claim 1 or 8, wherein said semiconductor element is a thyristor.

* * * * *